United States Patent Office 3,400,046
Patented Sept. 3, 1968

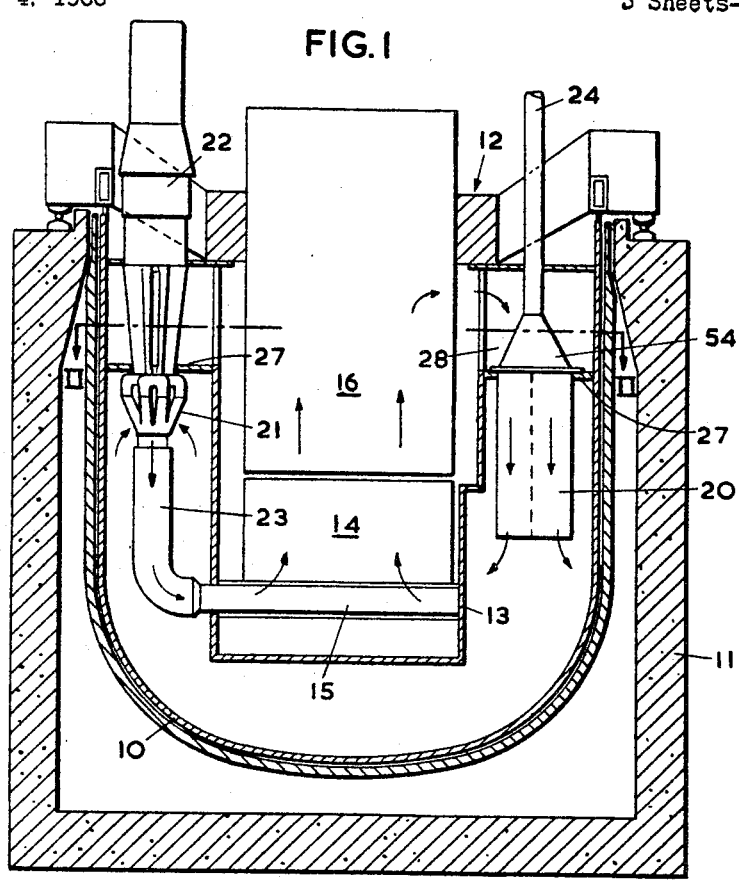

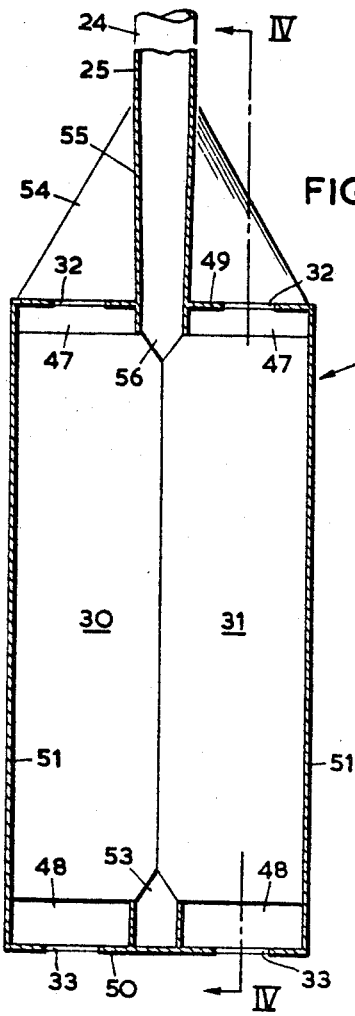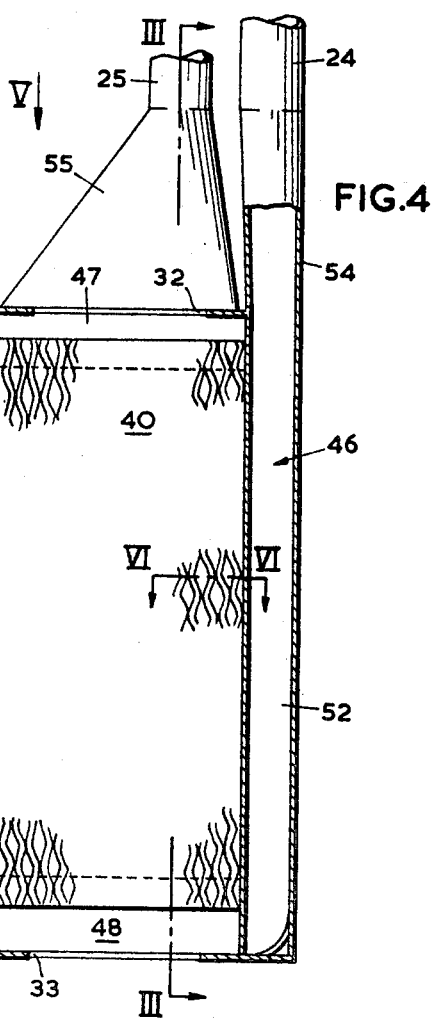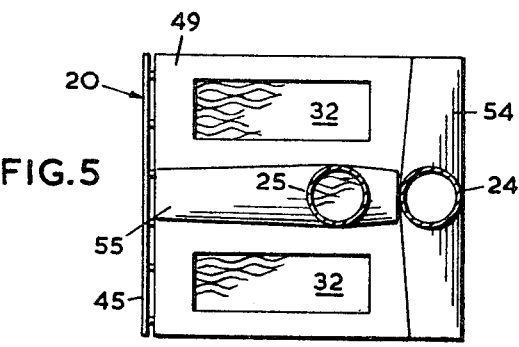

3,400,046
HEAT EXCHANGE MEANS IN A LIQUID-METAL COOLED NUCLEAR REACTOR
Allen Barker, Whetstone, England, assignor to The English Electric Company Limited, London, England, a British company
Filed Feb. 4, 1966, Ser. No. 525,265
Claims priority, application Great Britain, Feb. 5, 1965, 5,215/65
1 Claim. (Cl. 176—40)

ABSTRACT OF THE DISCLOSURE

In a liquid-metal cooled nuclear reactor in which the core and the primary heat exchangers are arranged in a reactor tank containing the reactor coolant, the heat exchangers are of a plate type in which the plates are in a continuously undulating form both transversely and longitudinally so as to consist of alternate concave and convex dimples and are so arranged as to permit parallel flow, the spaces between the plates for flow of reactor coolant therethrough being of constant width.

---

This invention relates to nuclear reactors of the kind in which provision is made for heat to be removed from nuclear fuel by a liquid metal coolant.

This type of reactor is commonly referred to as a fast reactor, and comprises a large reactor tank within which is situated the reactor core, comprising nuclear fuel and reactivity control means. The tank is enclosed within suitable biological shielding, usually of concrete.

Also provided are one or more primary heat exchangers, which may or may not be within the reactor tank. Within the tank there are a pump or pumps and ducting for passing a primary liquid metal coolant in a closed circuit through the reactor core, in which the coolant is heated by the fuel, and thence through the primary side of the heat exchanger or exchangers. The coolant passes thence back to the core, the pumps being situated at a convenient point in the primary coolant circuit, usually between the heat exchangers and the inlet side of the reactor core.

The secondary side of the primary heat exchangers is arranged in a secondary coolant circuit, through which a secondary coolant fluid is passed. The secondary coolant may be an elastic fluid for driving a turbine, or it may be a fluid such as a liquid metal which gives up its heat (transferred to it in the heat exchangers in the reactor tank) to an elastic fluid in a boiler or boilers situated (usually) outside the reactor.

It is known to provide the primary heat exchangers in the form of tube-and-shell type heat exchangers. This arrangement has the disadvantage that such heat exchangers are heavy and occupy an excessive amount of space in the reactor tank. The result is that the tank, the biological shielding and the reactor buildings, as well as the reactor support structure and the foundations must be made undesirably large, thus adding very considerably to the expense of the reactor installation as a whole.

An alternative arrangement is to provide tube-and-shell primary heat exchangers outside the reactor tank but within the biological shielding. This reduces the size and weight of the tank but tends to increase that of the shielding: it also involves extra pipework, which since it has to contain high-temperature liquid metal is therefore of such materials as stainless steel and provided with special antileakage means, is very expensive indeed. A further disadvantage is that such extra pipework has a serious effect on the pressure drop through the primary coolant circuit, necessitating more powerful and therefore less economic pumps.

It is an object of the present invention to reduce the size and weight of the reactor installation, and the cost thereof, by providing heat exchangers which are substantially more compact than those hitherto known in fast reactors.

A further object of the invention is to provide heat exchangers which are compact enough to be situated within the reactor tank without necessitating an uneconomic increase in the size of the reactor tank.

Another object of the invention is to provide a circuit for the primary coolant in which all pipework for the primary coolant is eliminated, at least so far as that part of the circuit between the output side of the reactor core and the inlet of the heat exchangers is concerned, whereby to reduce the pressure drop in the circuit.

Yet another object of the invention is to reduce this pressure drop still further by providing a path for primary coolant through the heat exchangers offering as little resistance to flow as possible.

According to the invention, therefore, in a nuclear reactor of the kind in which provision is made for heat to be removed from nuclear fuel by a liquid metal coolant and including a reactor tank, a fuel-bearing core arranged in said reactor tank outside said core, pump means in said reactor tank for passing a primary liquid-metal coolant fluid in a closed circuit successively through said core and said heat exchangers, secondary inlet and outlet means connected to the heat exchangers for the passage of a secondary fluid respectively into said heat exchangers from outside the reactor for heat exchange therein with said primary coolant fluid, and out of said heat exchangers and thence out of the reactor, each said heat exchanger includes a plurality of generally parallel heat exchange plates defining passages between said plates, said passages comprising primary and secondary passages arranged alternately and arranged to communicate respectively with said closed circuit and with said secondary inlet and outlet means, whereby to allow heat transfer to take place from said primary to said secondary coolant fluid through the heat-exchange plates.

Plate-type heat exchangers, in which there are a plurality of generally parallel plates defining alternate primary and secondary passages between them, are well known in the art of heat exchangers, and the applicant makes no claim to heat exchangers generally of this kind.

However, as far as he is aware no fast reactor is known incorporating such a heat exchanger, arranged as defined in the preceding paragraph. Such an arrangement offers substantial advantages in that such heat exchangers are much more compact than comparable tube-and-shell type units, due to their increased efficiency: the result is a considerable reduction in the size of the reactor tank and therefore in the size and weight of the shielding, support structure, reactor building and foundations. This in turn is reflected in a spectacular reduction in the capital cost of the installation. For example, in one cost study the cost of an installation, similar to that, which will presently be described, has been estimated at £750,000 ($2.1 million) for the heat exchangers and their associated pipework, compared with £2½ million ($7 million) for an installation of the same net power output incorporating tube-and-shell type heat exchangers arranged outside the reactor tank.

Compactness of the heat exchangers is further reduced by the following preferred features of the invention:

(a) Each heat exchanger includes a generally rectangular casing enclosing said heat-exchange plates, said casing comprising parallel compression and end plates between which said heat-exchange plates are held, and said compression and end plates being joined by two pairs of parallel side members of the casing.

(b) Said end plate is hollow so as to define an inlet duct communicating with said secondary inlet means and with a secondary inlet manifold within one end of said casing, said secondary outlet means being in communication with a secondary outlet manifold within the other end of said casing and said secondary passages constituting a flow path between said manifolds.

(c) The parallel side members constituting one said pair thereof, and arranged adjacent the ends of said primary passages, are provided with ports communicating respectively with two separate spaces within the reactor tank, said primary passages constituting a flow path between the ports in one said side member and those in the other.

(d) Said heat exchange plates are arranged in a plurality of groups within a single said casing with a common said inlet manifold and a common said outlet manifold.

The heat transfer efficiency and compactness and rigidity of its structure are improved still further by the following further preferred features of the invention:

(e) The said heat-exchange plates are of the dimpled type, arranged in pairs, the plates of each pair being joined together through dimples thereof.

(f) The pressure drop along the said primary passages is minimised by arranging that said primary passages are disposed between adjacent said pairs of heat-exchange plates, said secondary passages being disposed between the plates of each said pair and the dimples on the plates being so arranged that each said primary passage is of substantially constant width.

In addition, features (c), (e) and (f) above offer the following advantages: pipework is eliminated in the primary coolant circuit between the outlet side of the reactor core and the inlet of the heat exchangers, and is also rendered unnecessary at the heat exchanger outlets; and the path for primary coolant through the heat exchangers affords a minimal resistance to fluid flow.

One nuclear reactor in a preferred form according to the invention will now be described by way of example and with reference to the accompanying drawings, of which:

FIG. 1 is a simplified sectional elevation of the reactor, taken on the line I—I of FIG. 2;

FIG. 2 is a simplified sectional plan view taken on the line II—II of FIG. 1;

FIG. 3 is a simplified sectional elevation of one heat-exchanger incorporated in the reactor taken on the line III—III of FIG. 4;

FIG. 4 is a simplified sectional elevation taken on the line IV—IV of FIG. 3;

FIG. 5 is a plan view in the direction of the arrow V in FIG. 4; and

Figure 6:
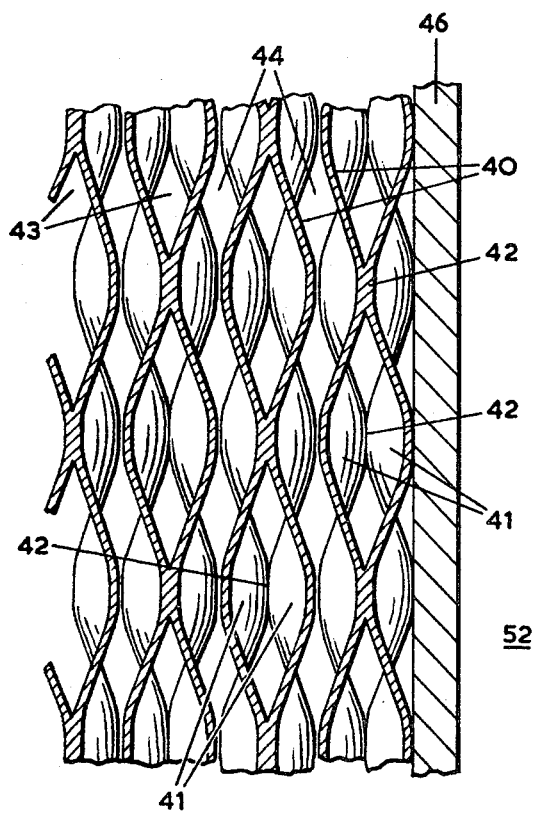
FIG. 6 is a sectional plan on a larger scale of part of a typical heat-exchange plate assembly incorporated in the heat exchanger shown in FIGS. 3 to 5, taken on the line VI—VI of FIG. 4.

With reference firstly to FIGS. 1 and 2, the reactor includes a reactor tank 10 mounted within concrete shielding 11, on top of which is mounted a spider beam 12. From the spider beam 12 there is supported a hollow structure 13 in which the reactor core, indicated at 14 and containing nuclear fuel (not shown), is mounted above an inlet plenum 15 and below charge/discharge machinery indicated diagrammatically at 16, all supported by the spider beam 12.

Within the reactor tank 10 there are a number of heat exchangers 20 and primary coolant pumps 21. Each primary coolant pump 21 is driven by a driving unit 22 and is arranged to draw primary liquid-metal coolant through an annular inlet of the pump and to discharge it down through a main inlet duct 23 to the inlet plenum 15, whence the coolant passes up through the core 14, receiving heat from the fuel therein. From the upper end of the core 14 the primary coolant passes through an outlet plenum 28 to the top of, and thence down through, the heat exchangers 20, in which heat is transferred from the primary coolant to a secondary liquid-metal coolant passing into and out of the heat exchangers through main secondary coolant ducts 24, 25 (shown in one only of the heat exchangers 20 in FIG. 2, although the arrangement is the same for all).

The primary coolant, leaving each heat exchanger 20 at the bottom thereof, passes back through the lower part of the tank 10 to the pumps 21. The general direction of flow of the primary coolant is indicated by arrows in FIG 1.

The reactor tank 10 is divided horizontally by a launder plate 27, the space above the latter being the common outlet plenum 28. Substantially the only openings in the launder plate 27 are those in which the heat exchangers 20 and the drives 22 to the pumps 21 are mounted, the openings in plate 27 being sealed by suitable means so that the only outlet for primary coolant from the plenum 28 is through the heat exchangers 20. The outlet plenum 28 (above the surface of primary coolant therein) is, in operation, filled with an inert gas such as argon.

With reference now to FIGS. 3 to 5, each heat exchanger 20 comprises two plate-type heat-exchanger units 30, 31 which are arranged side by side and which comprise generally vertical packs of parallel plates 40. The plates 40 are of the corrugated and dimpled form shown in FIG. 6 and are arranged in pairs, the plates of each pair being spot-welded together at the centres of corresponding dimples 41 as shown at 42. Between the plates of each pair there is a secondary coolant passage 43, and between each pair of plates and the next pair there is a primary coolant passage 44. It will be noted that the primary coolant passages 44 are less obstructed than the secondary coolant passages 43, by virtue of the absence of welded dimples in the former, the dimples being so arranged that each primary passage 44 is of substantially constant width. Thus the pressure drop along the passages 44 is minimised. The spacing between each pair of plates and the next is maintained by spacers (not shown) mounted in the ends of the passages 44 and having substantial spaces betweeen them to allow as free a flow of primary coolant fluid as possible.

Each heat exchanger 20 has a casing including a vertical fabricated compression plate 45 and a hollow fabricated end plate 46, between which the unit 30, 31 are sandwiched, the height of the latter being less than that of the plates 45 and 46 so as to leave primary coolant inlet plena 47 above the plates and primary coolant outlet plena 48 below them. The plena 47, 48 communicate with the interior of the reactor tank 10 through inlet and outlet ports 32, 33 formed in top and bottom plates 49, 50 respectively of the heat exchanger, the plates 49 and 50 forming part of the casing. The casing is completed by side plates 51, and the sides of the passages 43, 44 between the plates 40 adjacent the side plates 51 are closed by suitable means (not shown).

The interior of the hollow end plate 46 comprises a secondary coolant inlet duct 52 which leads to a central secondary coolant inlet manifold 53 between the plena 48. An inlet trunk 54 connects duct 52 with the main secondary coolant inlet duct 24, while an outlet trunk 55 connects the main secondary coolant duct 25 with a central outlet manifold 56 between the plena 47.

The manifolds 53, 56 are V-shaped, the plates 40 being formed accordingly, as seen in FIG. 3. The passages 43, 44 in the units 30, 31 are suitably sealed off at their ends, by means not shown, so that the passages 43 communicate with only the manifolds 53 and 56 and the passages 44 with only the plena 47 and 48.

It can therefore be seen that there is a path for primary coolant through the ports 32, plena 47, passages 44, plena 48 and ports 33; and a path for secondary coolant from duct 24, through trunk 54, duct 52, manifold 53, passages 43, manifold 56 and trunk 55 to duct 25. It can also be seen that the primary and secondary coolants are in contra-flow in each heat exchanger 20.

The secondary coolant after entering the ducts 25 passes, for example to boilers (not shown) where its heat is given up to water to create steam for driving a turbine.

The arrangement of heat exchangers need not be that shown in FIGS. 3 to 5; single separate heat-exchanger units or packs of plates may be used instead. Alternatively, the heat-exchanger units 30, 31 may be in groups of more than two (four, for example) in a single casing, with inlet and outlet arrangement for each coolant common to all the units in the group.

It will be understood that the arrangement of heat exchangers and pumps need not be as shown in FIG. 2, which is merely one example of many possible arrangements. In other examples, all the pumps may be arranged together and all the heat exchangers together also.

It will be noted that the number of heat exchangers 20 and of pumps 21 is the same in this example, but this need not be the case. The pumps 21 may be of any suitable type and may be driven by electric drives, or by steam turbines or by any other suitable means.

It will also be understood that the particular interior construction of heat exchanger described herein is given only by way of example and is not to be taken as limiting the invention to this form of construction. The type of plate used in the heat exchangers, and the methods of taking the fluid to and from the plates, may be varied in any convenient way, the dimpled type shown in FIG. 6 being only one example.

The primary coolant may be liquid sodium, or a sodium-potassium mixture, or any other suitable liquid metal or mixture thereof. The secondary coolant may be the same metal or mixture of metals as the primary coolant or a different metal or mixture of metals, or any other suitable fluid.

The heat exchangers may if desired be arranged for parallel-flow instead of contra-flow as in the example described herein.

I claim:

1. A nuclear reactor comprising a generally cylindrical reactor tank in which there are a fuel-containing core, a plurality of heat exchangers outside the core and pump means in the tank for passing a liquid-metal coolant fluid in closed circuit from the tank, through the core and thence vertically through the heat exchangers back to the tank, each heat exchanger comprising a pack, rectangular in cross-section, of generally parallel plates defining between them a plurality of first vertical passages alternating with a plurality of second vertical passages, for said coolant and for a second fluid respectively, each heat exchanger having also inlet and outlet openings for said coolant fluid at the top and bottom respectively of the heat exchanger and communicating directly with said first passages, and inlet and outlet means for said second fluid communicating with opposite ends of said second passages, the improvement being characterised in that, in such a heat exchanger in such a reactor, said ends of the first and second passages are at the same two opposite sides of the heat exchanger so that the flow paths of the said fluids are both vertical, each said plate being in a continuously undulating form in both the longitudinal and transverse directions so as to consist of a plurality of dimples continuous with each other and comprising rows of alternate concave and convex dimples in both said directions, the plates being arranged in pairs with each longitudinal row of dimples lying in the same longitudinal plane as the corresponding longitudinal row in all the other plates and each transverse row in the same transverse plane as the corresponding transverse row in all the other plates, the plates of each pair having each dimple convex on the side nearest to the other plate where the corresponding dimple on the other plate is convex, each said pair being disposed relative to the next adjacent pair so that each dimple of one pair is convex on the side nearest to the other pair where the corresponding dimple on the other pair is concave, and said first and second passages comprising respectively the spaces between the said pairs of plates and between the plates of each pair, whereby the said first passages are of constant width.

References Cited
UNITED STATES PATENTS

| | | | |
|---|---|---|---|
| 1,775,103 | 9/1930 | Hume | 165—166 |
| 2,620,169 | 12/1952 | Gross et al. | 165—166 X |
| 2,959,400 | 11/1960 | Simpelaar | 165—166 X |
| 2,961,393 | 11/1960 | Monson | 176—40 |
| 3,129,756 | 4/1964 | Ramen | 165—166 X |
| 3,182,002 | 5/1965 | Laithwaite et al. | 176—40 X |
| 3,242,981 | 3/1966 | Hutchinson et al. | 176—65 X |

REUBEN EPSTEIN, *Primary Examiner.*